United States Patent
Park (10) Patent No.: US 7,289,240 B2
(45) Date of Patent: Oct. 30, 2007

(54) METHOD AND APPARATUS TO CORRECT THE LENGTH OF AN IMAGE IN A FLATTEN SCANNER

(75) Inventor: Seong-kyoo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 851 days.

(21) Appl. No.: 10/745,677

(22) Filed: Dec. 29, 2003

(65) Prior Publication Data

US 2004/0141208 A1 Jul. 22, 2004

(30) Foreign Application Priority Data

Jan. 17, 2003 (KR) .................. 10-2003-0003252

(51) Int. Cl.
- *H04N 1/393* (2006.01)
- *H04N 1/409* (2006.01)
- *H04N 1/046* (2006.01)
- *H04N 1/10* (2006.01)

(52) U.S. Cl. .............. 358/1.2; 358/451; 358/474; 358/486; 358/497; 358/3.26

(58) Field of Classification Search ............ 358/1.2, 358/1.9, 3.24, 3.26, 528, 451, 477, 474, 486, 358/494, 497; 382/286, 298

See application file for complete search history.

(56) References Cited

U.S. PATENT DOCUMENTS

| 5,535,007 A * | 7/1996 | Kim ..................... 358/451 |
| 6,400,854 B1 * | 6/2002 | Kudoh .................. 382/317 |
| 2003/0128374 A1 * | 7/2003 | Brothers et al. ........... 358/1.2 |

* cited by examiner

*Primary Examiner*—Scott A. Rogers
(74) *Attorney, Agent, or Firm*—Stanzione & Kim, LLP (57) ABSTRACT

A method and an apparatus to correct the length of an image in a flatten scanner. The method includes moving an image sensor by driving a motor; calculating a first number of pixels; calculating a difference between the first number of pixels and a second number of pixels; and correcting the length of the image scanned in the flatten scanner by using the calculated difference. Therefore, the method makes it possible that a scanned image can have the same length as that of an original image by using the difference between the first and second numbers of pixels. In addition, when a flatten scanner is developed, necessity for fine adjustment to correct the length of a scanned image is eliminated, and, therefore, time required to develop a scanner is shortened.

20 Claims, 4 Drawing Sheets

METHOD AND APPARATUS TO CORRECT THE LENGTH OF AN IMAGE IN A FLATTEN SCANNER

CROSS-REFERENCE TO RELATED APPLICATIONS

This application claims the priority of Korean Patent Application No. 2003-3252, filed on Jan. 17, 2003, in the Korean Intellectual Property Office, the disclosure of which is incorporated herein in its entirety by reference.

BACKGROUND OF THE INVENTION

1. Field of the Invention

The present invention relates to a flatten scanner, and more particularly, to a method and apparatus to correct the length of an image and capable of correcting the length of an image scanned in a flatten scanner.

2. Description of the Related Art

In a conventional flatten scanner, the length of a scanned image cannot be corrected separately. Therefore, in order to correct the length of an image scanned in a flatten scanner, fine adjustments dealing with the length of an image have been made in advance, namely, when a flatten scanner is developed. Due to such adjustments, the development of a new flatten scanner takes an extended amount of time.

Moreover, since errors in the length of an image, which vary among flatten scanners, are uniformly compensated for in the development of a flatten scanner, a problem in which errors in the length of an image cannot be corrected precisely exists.

SUMMARY OF THE INVENTION

It is an aspect of the present invention to provide a method of correcting the length of an image scanned in a flatten scanner that is capable of correcting the length of the image by using the amount of predetermined pattern read per unit time.

It is another aspect of the present invention to provide an apparatus to correct the length of an image scanned in a flatten scanner that is capable of correcting the length by using the amount of a predetermined pattern read per unit time.

Additional aspects and/or advantages of the invention will be set forth in part in the description which follows and, in part, will be obvious from the description, or may be learned by practice of the invention.

The foregoing and/or other aspects of the present invention are achieved by providing a method of correcting the length of an image which is performed in a flatten scanner having an image sensor which is driven by a motor and senses an original document, the method comprising: moving the image sensor by driving the motor; calculating a first number of pixels; calculating a difference between the first number of pixels and a second number of pixels; and correcting the length of the image scanned in the flatten scanner by using the calculated difference.

The foregoing and/or other aspects of the present invention are also achieved by providing an apparatus to correct the length of an image which is included in a flatten scanner having an image sensor which is driven by a motor and senses an original document, the apparatus comprising: a controlling portion generating a motor controlling signal to drive the motor; a beginning-portion deciding portion deciding whether or not the image sensor moved by the motor reaches a beginning portion of the predetermined pattern and outputting the decided results as a beginning signal; a reading portion reading the predetermined pattern responding to the beginning signal and an end signal; an end-portion deciding portion deciding whether or not the image sensor reaches an end portion of the predetermined pattern and outputting the decided results as the end signal; a pixel-number calculating portion, responding to the end signal, receiving the read results of the predetermined pattern from the reading portion and calculating a first number of pixels from the read results, the first number of pixels representing a number of pixels per unit time read by the image sensor; a pixel-number-difference calculating portion calculating a difference between the first number of pixels and a second number of pixels, the second number of pixels being a number of pixels per unit time read by the image sensor when the predetermined pattern is normally read by the image sensor; and a length correcting portion correcting the length of an image scanned in the flatten scanner corresponding to the difference.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

A method of correcting the length of an image in a flatten scanner according to an embodiment of the present invention will now be described.

Figure 1:
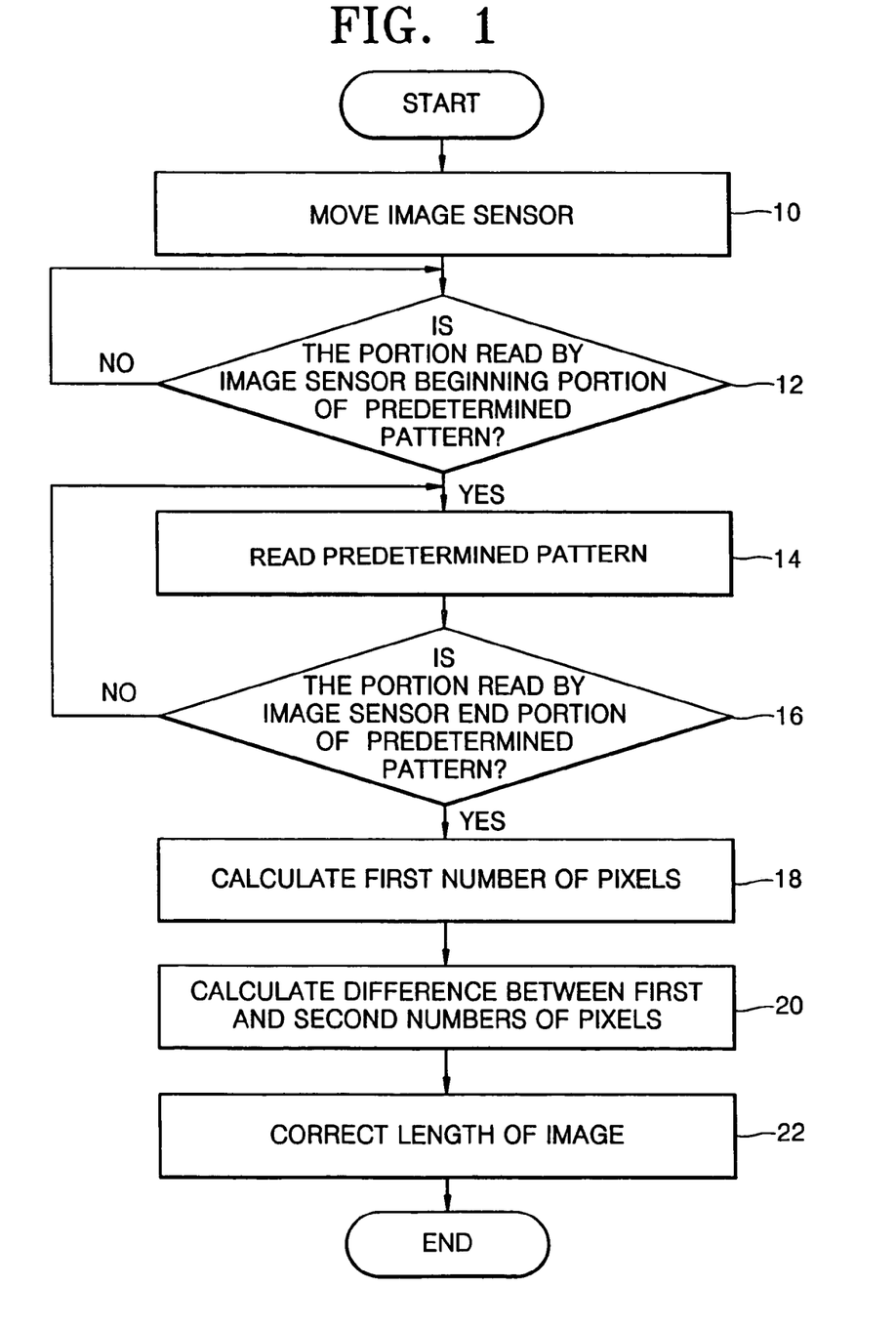
FIG. 1 is a flow chart explaining a method of correcting the length of an image in a flatten scanner according to an embodiment of the present invention.

FIG. 1 is a flow chart explaining a method of correcting the length of an image in a flatten scanner according to an embodiment of the present invention. The method shown in FIG. 1 includes the operations of reading a predetermined pattern from the front end thereof to the rear end thereof while moving an image sensor (operations 10, 12, 14, and 16) and correcting the length of an image by using a difference between a first number of pixels and a second number of pixels (operations 18, 20, and 22).

Figure 2:
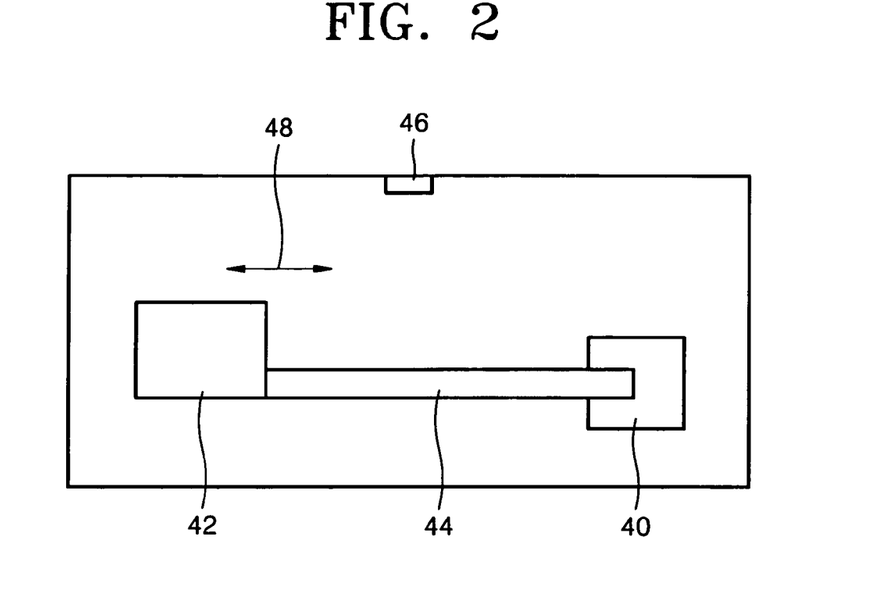
FIG. 2 is a diagram schematically illustrating an example of a flatten scanner according to an embodiment of the present invention.

FIG. 2 is a diagram schematically illustrating an example of a flatten scanner. Referring to FIG. 2, a flatten scanner has a motor 40, an image sensor 42, a belt 44, and a predetermined pattern 46.

In FIG. 2, the image sensor 42 is connected to the motor 40 by the belt 44 and moves in a direction along which the image sensor 42 senses an original document or in a direction opposite to the document sensing direction, i.e., in the right direction 48 or the left direction 48, as the motor 40 rotates. That is, the image sensor 42 serves to sense the original document while being driven by the motor 40. To this end, the image sensor 42 includes a light emitting portion (not shown) and a light receiving portion (not shown). Here, the light emitting portion acts to emit a light beam toward an original document or the predetermined pattern 46, and the light receiving portion acts to receive a light beam reflected from the original document or the predetermined pattern 46.

Now, a method of correcting the length of an image in a flatten scanner according an embodiment of to the present invention as shown in FIG. 1 will be described with reference to FIG. 2. However, this embodiment is not limited to use with the example of a flatten scanner shown in FIG. 2.

First, the image sensor 42 moves in the direction of sensing the original document by driving the motor 40 in operation 10.

After operation 10, it is decided whether or not a portion read by the image sensor 42 is the beginning portion of the predetermined pattern 46 in operation 12. That is, while the image sensor 42 moves in the direction of scanning the original document in the flatten scanner, whether or not the image sensor 42 has reached the beginning portion of the predetermined pattern 46 is decided. When the portion read by the image sensor 42 is decided to be the beginning portion of the predetermined pattern 46, the image sensor 42 reads the predetermined pattern 46 in operation 14. After operation 14 is performed, it is decided whether or not the portion read by the image sensor 42 is the end portion of the predetermined pattern 46 in operation 16. That is, while the image sensor 42 moves in the direction of scanning the original document in the flatten scanner, whether or not the image sensor 42 has reached the end portion of the predetermined pattern 46 is decided. When a read portion is decided not to be the end portion of the predetermined pattern 46, operation 14 continues. That is, when the read portion is not the end portion of the predetermined pattern 46, the image sensor 42 continues to read the predetermined pattern 46. Here, the number of rotations of the motor 40 may be used in order to decide whether or not the image sensor 42 has reached the beginning portion or the end portion of the predetermined pattern 46.

When the read portion is decided to be the end portion of the predetermined pattern 46, that is, when the image sensor 42 is decided to have reached the end portion of the predetermined pattern 46, the number of pixels of the predetermined pattern 46 read by the image sensor 42 per unit time is calculated (operation 18). Here, the number of pixels of the predetermined pattern 46 read per unit time corresponds to the first number of pixels, that is, a number of pixels per unit time which the image sensor 42 can read when the predetermined pattern 46 is read by the image sensor 42.

Here, the method of FIG. 1 may not include operations 12 through 16. In that case, the first number of pixels are calculated after operation 10 (operation 18).

After operation 18, a difference between the first number of pixels and the second number of pixels is calculated (operation 20). Here, the second number of pixels is defined as a number of pixels per unit time which the image sensor 42 can read when the predetermined pattern 46 is normally read by the image sensor 42. At this time, the unit time used when the first number of pixels is calculated is the same as the unit time used when the second number of pixels is defined.

After operation 20, the length of an image scanned in the flatten scanner is corrected by using the difference between the first and second numbers of pixels (operation 22).

The length of an image can be corrected according to the following embodiments of the present invention.

According to an embodiment of the present invention, a rotational speed of the motor 40 can be controlled by using the difference between the first and second numbers of pixels calculated in operation 20 (operation 22). That is, the rotational speed of the motor 40 is increased or decreased in accordance with the difference between the first and second numbers of pixels. For example, when the first number of pixels is greater than the second number of pixels, the moving speed of the image sensor 42 is found to be faster than a normal speed. That is, the speed of the motor 40 causing the image sensor 42 to move is faster than the normal speed thereof. Therefore, the speed of the motor 40 is decreased so that the first number of pixels can be the same as the second number of pixels. In contrast, when the second number of pixels is greater than the first number of pixels, the moving speed of the image sensor 42 is found to be slower than the normal speed. That is, the speed of the motor 40 causing the image sensor 42 to move is slower than the normal speed thereof. Therefore, the speed of the motor 40 is increased so that the first number of pixels can be the same as the second number of pixels.

According to another embodiment of the present invention, the cycle of sensing the original document can be controlled by using the difference between the first and second numbers of pixels calculated in operation 20 (operation 22). That is, the time interval required for the image sensor 42 to sense the original document can be controlled, i.e., the cycle can be increased or decreased in accordance with the difference between the first and second numbers of pixels. For example, when the first number of pixels is greater than the second number of pixels, the moving speed of the image sensor 42 is found to be faster than a normal speed. That is, the cycle of the image sensor 42 sensing the original document is smaller than the normal cycle. Therefore, the cycle of the image sensor 42 sensing the original document is increased so that the first number of pixels can be the same as the second number of pixels. In contrast, when the second number of pixels is greater than the first number of pixels, the moving speed of the image sensor 42 is found to be slower than the normal speed. That is, the cycle of the image sensor 42 sensing the original document is greater than the normal cycle. Therefore, the cycle of the image sensor 42 sensing the original document is decreased so that the first number of pixels can be the same as the second number of pixels.

According to yet another embodiment of the present invention, the length of a scanned image can be shortened or lengthened by using the difference between the first and second numbers of pixels calculated in operation 20 instead of controlling the rotational speed of the motor 40 or the cycle of sensing the original document by the image sensor 42. That is, the length of an image which has been lengthened or shortened in accordance with the difference between the first and second numbers of pixels can be shortened or lengthened to be the same as the original length of the image. For example, when the first number of pixels is greater than the second number of pixels, the length of a scanned image is shorter than the original length of the image since the moving speed of the scanned image sensor 42 is faster than a normal speed. Therefore, the length of the image is lengthened so that the scanned length of the image can be the same as the original length of the image. In contrast, when the second number of pixels is greater than the first number of pixels, the length of a scanned image is longer than the original length of the image since the moving speed of the image sensor 42 is slower than the normal speed. Therefore, the scanned length of the image is shortened so that the length of the scanned image can be the same as the original length of the image.

Figure 3:
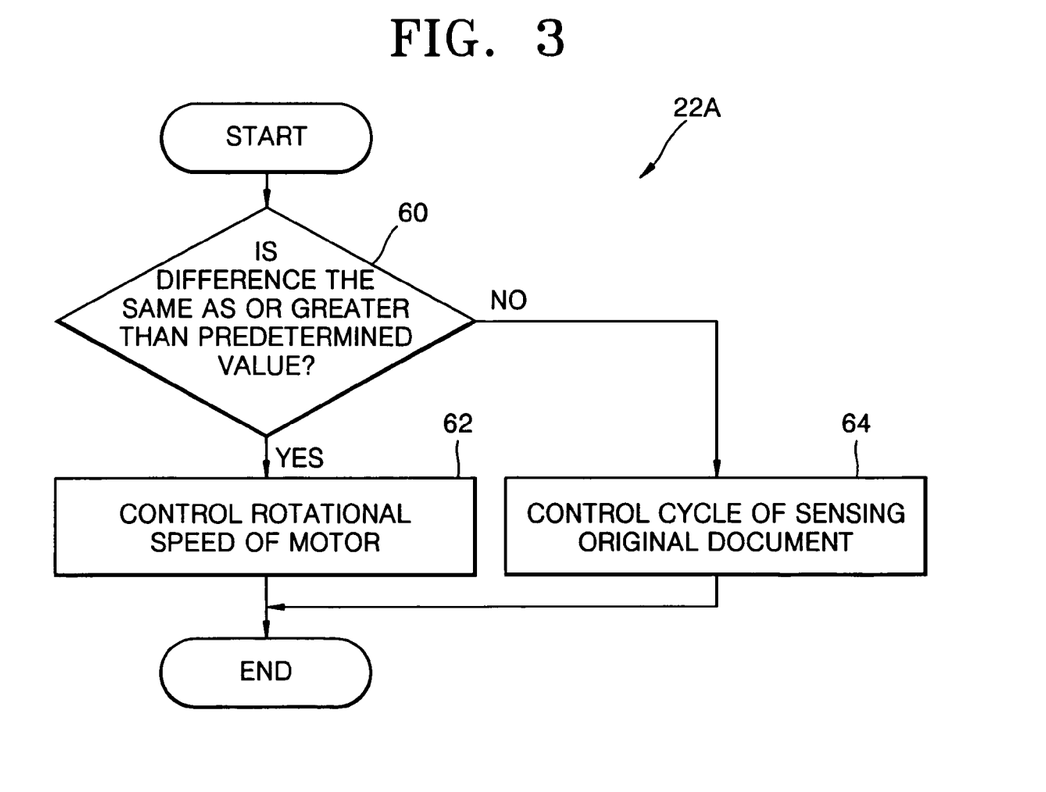
FIG. 3 is a flow chart explaining operation 22 of FIG. 1 according to another embodiment of the present invention.

FIG. 3 is a flow chart explaining an embodiment 22A of operation 22 of FIG. 1 of the present invention. This embodiment 22A includes operations (operations 60, 62, and 64) of correcting the length of a scanned image in different manners according to the result of comparing a difference between the first and second numbers of pixels with a predetermined value.

According to this embodiment 22A shown in FIG. 3, whether or not the difference calculated in operation 20 is the same as or greater than the predetermined value is decided in operation 60. When it is decided that the difference between the first and second numbers of pixels is the same as or greater than the predetermined value, the rotational speed of the motor 40 is controlled by using the difference between the first and second numbers of pixels in operation 62. For example, since the difference between the first and second numbers of pixels is relatively great when the difference between the first and second numbers of pixels is the same as or greater than the predetermined value, the rotational speed of the motor 40 is controlled so as to correct the length of a scanned image to a greater degree.

On the other hand, when it is decided that the difference between the first and second numbers of pixels is smaller than the predetermined value, the cycle of sensing the original document is controlled by using the difference between the first and second numbers of pixels in operation 64. For example, since the difference between the first and second numbers of pixels is relatively small when the difference between the first and second numbers of pixels is smaller than the predetermined value, the cycle of sensing the original document is controlled so as to correct the length of a scanned image to a lesser degree.

Controlling the rotational speed of the motor 40 can correct the length of a scanned image to a greater degree than controlling the cycle of sensing the original document.

Now, the structure and the operation of an apparatus to correct the length of an image in a flatten scanner according to an embodiment of the present invention will be described with reference to the attached drawings.

Figure 4:
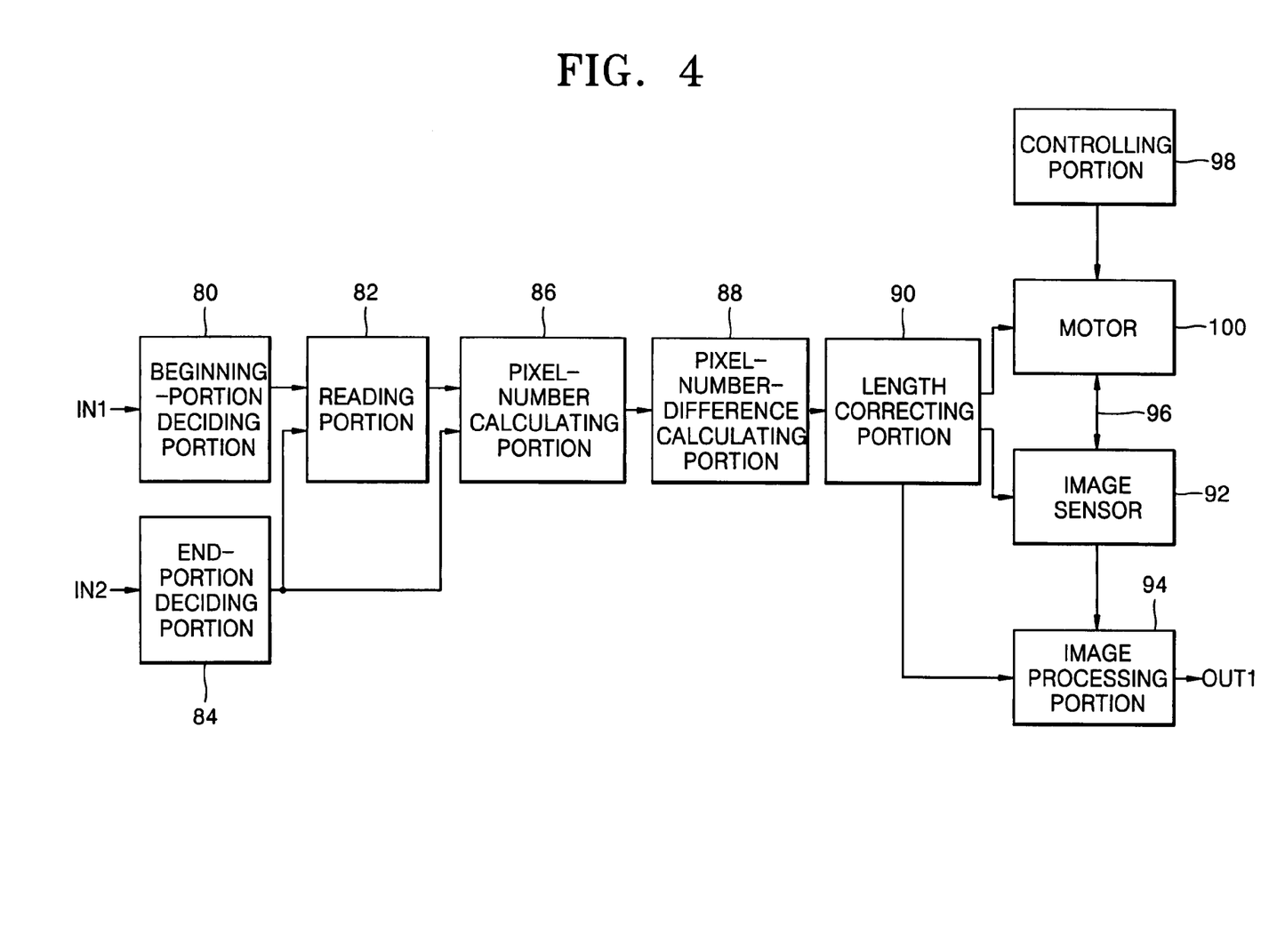
FIG. 4 is a block diagram illustrating an apparatus to correct the length of an image in a flatten scanner according to another embodiment of the present invention.

FIG. 4 is a block diagram illustrating an embodiment of an apparatus to correct the length of an image in a flatten scanner according to an embodiment of the present invention.

Referring FIG. 4, the apparatus to correct the length of an image includes a beginning-portion deciding portion 80, a reading portion 82, an end-portion deciding portion 84, a pixel-number calculating portion 86, a pixel-number-difference calculating portion 88, a length correcting portion 90, an image sensor 92, an image processing portion 94, a motor 100, a belt 96 connecting the motor 100 and the image sensor 92, and a controlling portion 98. Here, the motor 100, the image sensor 92, and the belt 96 correspond to the motor 40, the image sensor 42, and the belt 44, respectively, as shown in FIG. 2.

The apparatus to correct the length of an image, as shown in FIG. 4, may perform the method of correcting the length of an image, as shown in FIG. 1. Therefore, in aid of understanding the embodiments of the present invention, while it is assumed that the apparatus to correct the length of an image shown in FIG. 4 performs the method of correcting the length of an image shown in FIG. 1, the structure and the operation of the apparatus to correct the length of an image shown in FIG. 4 will be described.

First, in order to perform operation 10 in FIG. 1, the controlling portion 98 generates a motor controlling signal to control the motor 100. At this time, the motor 100 is driven in response to the motor controlling signal input from the controlling portion 98 and causes the image sensor 92, connected by the belt 96, to move.

In order to perform operation 12 in FIG. 1, the beginning-portion deciding portion 80 decides whether or not the image sensor 92, driven by the motor 90, reaches the beginning portion of the predetermined pattern 46 and outputs the decided result as a beginning signal to the reading portion 82. To this end, the beginning-portion deciding portion 80 is input with a position of the image sensor 92 via an input terminal IN1 and can check whether or not the image sensor 92 reaches the beginning portion of the predetermined pattern 46 by analyzing the input position of the image sensor 92. In addition, the beginning-portion deciding portion 80 inputs the number of rotations of the motor 100 via the input terminal IN1 and can check whether or not the image sensor 92 reaches the beginning portion of the predetermined pattern 46 by using the input number of rotations.

In order to perform operation 14 in FIG. 1, responding to the beginning signal input from the beginning-portion deciding portion 80 and an end signal input from the end-portion deciding portion 84, the reading portion 82 reads the predetermined pattern 46 and outputs the read results to the pixel-number calculation portion 86. For example, when the reading portion 82 is informed by the beginning signal that the image sensor 92 reaches the beginning portion of the predetermined pattern 46, the reading portion 82 begins to read the predetermined pattern 46. In addition, when the reading portion 82 is informed by the end signal that the image sensor 92 reaches the end portion of the predetermined pattern 46, the reading portion 82 stops reading the predetermined pattern.

In order to perform operation 16 of FIG. 1, the end-portion deciding portion 84 checks whether or not the image sensor 92 reaches the end portion of the predetermined pattern 46 and outputs the checked results as an end signal to both the reading portion 82 and the pixel-number calculation portion 86. To this end, the end-portion deciding portion 84 inputs a position of the image sensor 92 via the input terminal IN2 and can check whether or not the image sensor 92 reaches the end portion of the predetermined pattern 46 by analyzing the input position. Or, the end-portion deciding portion 84 inputs the number of rotations of the motor 100 via the input terminal IN2 and can check whether or not the image sensor 92 reaches the end portion of the predetermined pattern 46 by using the input number of rotations.

In order to perform operation 18 of FIG. 1, responding to the end signal input from the end-portion deciding portion 84, the pixel-number calculating portion 86 inputs the read results from the reading portion 82, calculates the first number of pixels which is an amount of pixels read per unit time when the predetermined pattern 46 is read by the image sensor 92 from the input read results, and outputs the calculated first number of pixels to the pixel-number-difference calculating portion 88. For example, when the pixel-number calculating portion 86 is informed by the end signal that the image sensor 92 reaches the end portion of the predetermined pattern 46, the pixel-number calculating portion 86 calculates the first number of pixels.

In order to perform operation 20 of FIG. 1, the pixel-number-difference calculating portion 88 calculates a difference between the first and second numbers of pixels and outputs the calculated difference to the length correcting portion 90. To this end, the pixel-number-difference calculating portion 88 can store the second number of pixels in advance in the case of FIG. 4, or the second number of pixels may be input from an external source.

In order to perform operation 22 of FIG. 1, the length correcting portion 90 corrects the length of an image being scanned in the flatten scanner corresponding to the difference between the first and second numbers of pixels input from the pixel-number-difference calculating portion 88.

The above described embodiments of operation 22 of FIG. 1 will be performed by the following descriptions of the embodiments using the length correcting portion 90 of the present invention.

In order to perform the above described embodiment of controlling the rotational speed of the motor 40, the length correcting portion 90 generates a speed controlling signal corresponding to the difference between the first and second numbers of pixels input from the pixel-number-difference calculating portion 88 and outputs the generated speed controlling signal to the motor 100. At this time, the motor 100 rotates at a speed corresponding to the speed controlling signal input from the length correcting portion 90. Therefore, the speed of the motor 100 can be controlled with respect to the difference between the first and second numbers of pixels.

In order to perform the above described embodiment of controlling the cycle of sensing the original document, the length correcting portion 90 generates a cycle controlling signal corresponding to the difference between the first and second numbers of pixels input from the pixel-number-difference calculating portion 88 and outputs the generated cycle controlling signal to the image sensor 92. At this time, the image sensor 92 senses the original document in a cycle corresponding to the cycle controlling signal input from the length correcting portion 90. Therefore, the cycle of sensing the original document can be controlled with respect to the difference between the first and second numbers of pixels.

Here, the image sensor 92 shown in FIG. 4 senses and reads the original document laid on the flatten scanner and outputs the read results as an analog signal to the image processing portion 94. At this time, the image processing portion 94 converts the analog signal of the read results input from the image sensor 92 into a digital signal. Here, the digital signal corresponds to a scanned image.

In order to perform the above described embodiment of controlling the length of the scanned image, the length correcting portion 90 generates a magnitude controlling signal corresponding to the difference between the first and second numbers of pixels input from the pixel-number-difference calculating portion 88 and outputs the generated magnitude controlling signal to the image processing portion 94. At this time, the image processing portion 94 shortens or lengthens the length of the scanned image corresponding to the magnitude controlling signal input from the length correcting portion 90 and outputs the shortened or lengthened results via a terminal OUT1. Therefore, the length of the scanned image can be shortened or lengthened with respect to the difference between the first and second numbers of pixels.

Figure 5:
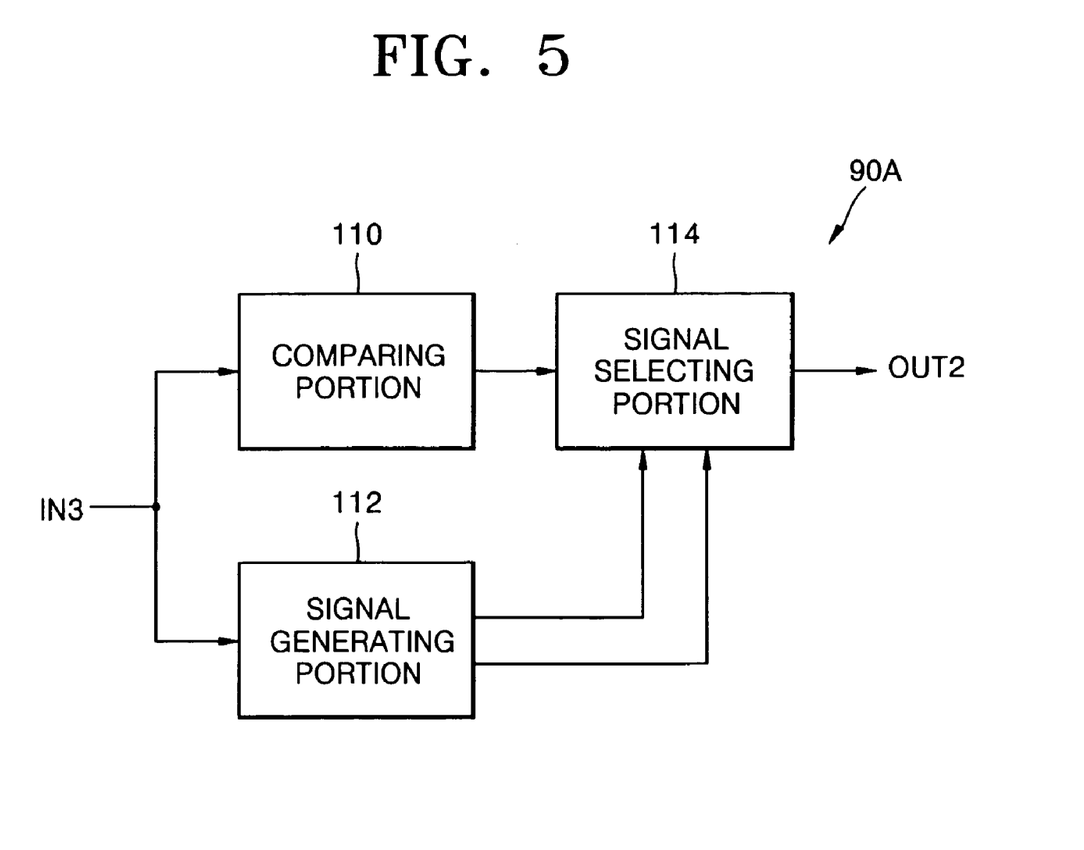
FIG. 5 is a block diagram illustrating the length correcting portion of FIG. 4 according to another embodiment of the present invention.

FIG. 5 is a block diagram illustrating an embodiment 90A of the length correcting portion 90 of FIG. 4 according to an embodiment of the present invention, where the length correcting portion 90A includes a comparing portion 110, a signal generating portion 112, and a signal selecting portion 114.

The length correcting portion 90A shown in FIG. 5 can perform the above-described embodiment 22A shown in FIG. 3. In order to perform operation 60, the comparing portion 110 of the length correcting portion 90A inputs the difference between the first and second numbers of pixels via an input terminal IN3, compares the input difference with a predetermined value, and outputs the compared results as a selection signal to the signal selecting portion 114.

In order to perform operations 62 and 64, the length correcting portion 90A may be provided with the signal generating portion 112 and the signal selecting portion 114. Here, the signal generating portion 112 generates a speed controlling signal and a cycle controlling signal corresponding to the difference between the first and second numbers of pixels and outputs the generated speed controlling signal and cycle controlling signal to the signal selecting portion 114. At this time, the signal selecting portion 114 selectively outputs one of the speed controlling signal and the cycle controlling signal to an output terminal OUT2 in response to the selection signal input from the comparing portion 110. For example, in order to perform operation 62, when the signal selecting portion 114 decides according to the selection signal that the difference between the first and second numbers of pixels is the same as or greater than the predetermined value, the signal selecting portion 114 selects the speed controlling signal generated in the signal generating portion 112 and outputs the speed controlling signal to the motor 100. On the other hand, in order to perform operation 64, when the signal selecting portion 114 decides according to the selection signal that the difference between the first and second numbers of pixels is less than the predetermined value, the signal selecting portion 114 selects the cycle controlling signal generated in the signal generating portion 112 and outputs the cycle controlling signal to the image sensor 92. At this time, the motor 100 rotates at a speed corresponding to the speed controlling signal output from the signal selecting portion 114, and the image sensor 92 senses the original document in a cycle corresponding to the cycle controlling signal output from the signal selecting portion 114.

As described above, the method and the apparatus to correct a length of an image in a flatten scanner according to the embodiments of the present invention make it possible for a scanned image to have the same length as that of an original image by using a difference between the first and second numbers of pixels. In addition, when a flatten scanner is developed, necessity for a fine adjustment to correct the length of a scanned image is eliminated, and, therefore, time required to develop a scanner can be shortened.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of correcting the length of an image which is performed in a flatten scanner having an image sensor which is driven by a motor and senses an original document having the image, the method comprising:

moving the image sensor by driving the motor;
calculating a first number of pixels;
calculating a difference between the first number of pixels and a second number of pixels; and
correcting the length of the image scanned in the flatten scanner by using the calculated difference.

2. The method according to claim 1, further comprising:
deciding whether a portion read by the image sensor is a beginning portion of a predetermined pattern;
reading the predetermined pattern when the portion read by the image sensor is the beginning portion of the predetermined pattern; and
deciding whether or not a portion read by the image sensor is an end portion of the predetermined pattern, returning to the operation of reading the predetermined pattern when it is decided that the portion read by the image sensor is not the end portion of the predetermined pattern, and returning to the operation of calculating the first number of pixels when it is decided that the portion read by the image sensor is the end portion of the predetermined portion.

3. The method according to claim 1, wherein the operation of calculating the first number of pixels is the operation of controlling a rotating speed of the motor by using the calculated difference.

4. The method according to claim 1, wherein the operation of calculating the first number of pixels is the operation of controlling a cycle of sensing the original document by using the calculated difference.

5. The method according to claim 1, wherein the operation of calculating the first number of pixels is the operation of shortening or lengthening the length of the scanned image by using the calculated difference.

6. The method according to claim 1, wherein the operation of calculating the first number of pixels includes:
deciding whether or not the calculated difference is the same as or greater than a predetermined value;
controlling a rotational speed of the motor by using the calculated difference when the calculated difference is the same as or greater than the predetermined value; and
controlling a cycle of sensing the original document by using the calculated difference when the calculated difference is smaller than the predetermined value.

7. The method according to claim 1, wherein the first number of pixels is a number of pixels of the predetermined pattern read by the image sensor per unit time.

8. The method according to claim 1, wherein the second number of pixels is a number of pixels per unit time which the image sensor can read when the predetermined pattern is normally read by the image sensor.

9. An apparatus to correct the length of an image which is included in a flatten scanner having an image sensor which is driven by a motor and senses an original document having the image, the apparatus comprising:
a controlling portion generating a motor controlling signal to drive the motor;
a beginning-portion deciding portion deciding whether or not the image sensor moved by the motor reaches a beginning portion of a predetermined pattern and outputting the decided results as a beginning signal;
a reading portion reading the predetermined pattern according to the results of the beginning signal and an end signal;
an end-portion deciding portion deciding whether or not the image sensor reaches an end portion of the predetermined pattern and outputting the decided results as the end signal;
a pixel-number calculating portion, responding to the end signal, receiving the read results of the predetermined pattern from the reading portion and calculating the first number of pixels from the read results, the first number of pixels representing a number of pixels per unit time read by the image sensor;
a pixel-number-difference calculating portion calculating a difference between the first number of pixels and a second number of pixels, the second number of pixels being a number of pixels per unit time read by the image sensor when the predetermined pattern is normally read by the image sensor; and
a length correcting portion correcting the length of an image scanned in the flatten scanner corresponding to the calculated difference.

10. The apparatus according to claim 9, wherein the length correcting portion generates a speed controlling signal corresponding to the calculated difference, and the motor rotates at a speed corresponding to the speed controlling signal.

11. The apparatus according to claim 9, wherein the length correcting portion generates a cycle controlling signal corresponding to the calculated difference, and the image sensor senses the original document in a cycle corresponding to the cycle controlling signal.

12. The apparatus according to claim 9, further comprising an image processing portion which shortens or lengthens the length of the scanned image corresponding to a magnitude controlling signal, wherein the length correcting portion generates the magnitude controlling signal corresponding to the calculated difference.

13. The apparatus according to claim 9, wherein the length correcting portion comprises:
a comparing portion comparing the calculated difference with a predetermined value and outputting the compared results as a selection signal;
a signal generating portion generating a speed controlling signal and a cycle controlling signal corresponding to the calculated difference; and
a signal selecting portion, responding to the selection signal, selectively outputting one of the speed controlling signal and the cycle controlling signal,
wherein the motor rotates at a speed corresponding to the speed controlling signal, and the image sensor senses the original document in the cycle corresponding to the cycle controlling signal.

14. A method of correcting the length of an image in a flatten scanner comprising:
reading a predetermined pattern from a front end of the pattern to a rear end of the pattern to determined a first number of pixels from the read pattern; and
correcting the length of the image by using a difference between the first number of pixels and a second number of pixels.

15. The method according to claim 14, wherein the second number of pixels is a number of pixels per unit time that can be normally read by a reading unit.

16. An apparatus to correct the length of an image in a flatten scanner having an image sensor driven by a motor, the apparatus comprising:
a controlling portion generating a motor controlling signal to drive the motor;

a reading portion reading a predetermined pattern of the image;

a pixel-number calculating portion, responding to completion of the read results, receiving the read results of the predetermined pattern from the reading portion and calculating a first number of pixels from the read results, the first number of pixels being a number of pixels per unit time read by the image sensor;

a pixel-number-difference calculating portion calculating a difference between the first number of pixels and a second number of pixels, the second number of pixels being a number of pixels per unit time read by the image sensor when the predetermined pattern is normally read by the image sensor; and a length correcting portion correcting the length of an image scanned in the flatten scanner corresponding to the calculated difference.

17. The apparatus according to claim 16, wherein the length correcting portion generates a speed controlling signal corresponding to the calculated difference, and the motor rotates at a speed corresponding to the speed controlling signal.

18. The apparatus according to claim 16, wherein the length correcting portion generates a cycle controlling signal corresponding to the calculated difference, and the image sensor senses the original document in a cycle corresponding to the cycle controlling signal.

19. The apparatus according to claim 16, further comprising an image processing portion which shortens or lengthens the length of the scanned image corresponding to a magnitude controlling signal, wherein the length correcting portion generates the magnitude controlling signal corresponding to the calculated difference.

20. The apparatus according to claim 16, wherein the length correcting portion comprises:

a comparing portion comparing the calculated difference with a predetermined value and outputting the compared results as a selection signal;

a signal generating portion generating a speed controlling signal and a cycle controlling signal corresponding to the calculated difference; and a signal selecting portion, responding to the selection signal, selectively outputting one of the speed controlling signal and the cycle controlling signal, wherein the motor rotates at a speed corresponding to the speed controlling signal, and the image sensor senses the original document in the cycle corresponding to the cycle controlling signal.

* * * * *